Nov. 30, 1926.                                                 1,608,656
G. E. HOWARD
METHOD OF AND APPARATUS FOR FORMING SHEET GLASS
Filed Feb. 17, 1926
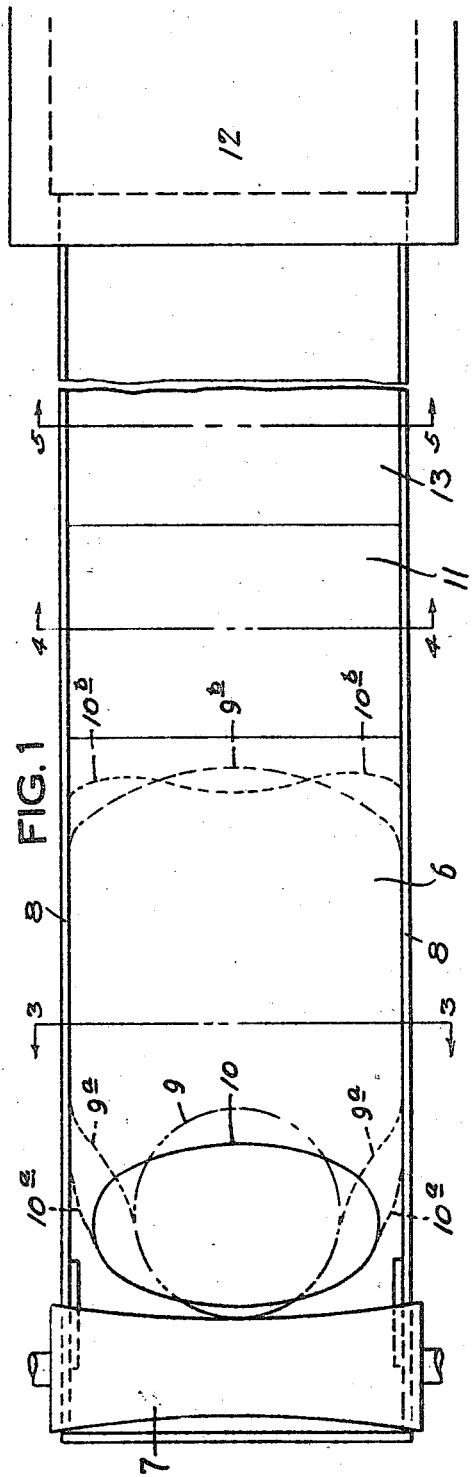
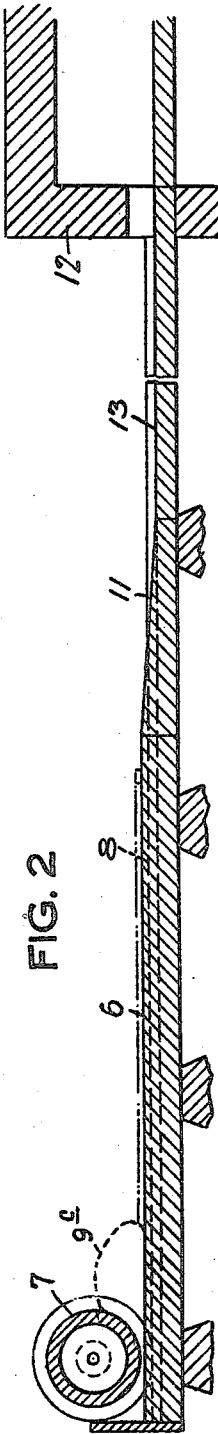
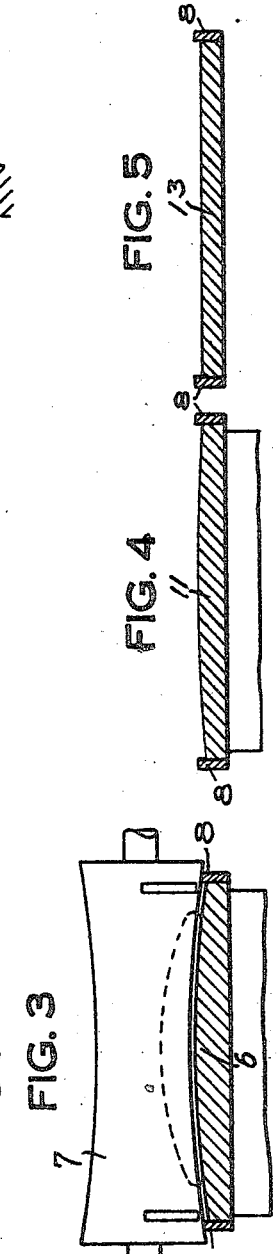
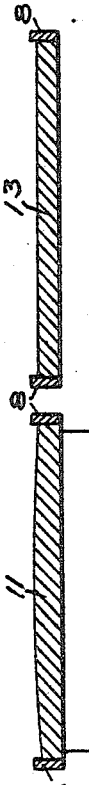
INVENTOR
GEORGE E. HOWARD
By Robert D. Burns
Attorney Patented Nov. 30, 1926.

1,608,656

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

METHOD OF AND APPARATUS FOR FORMING SHEET GLASS.

Application filed February 17, 1926. Serial No. 88,823.

My invention relates to a method of and apparatus for forming sheet glass, and particularly to the rolling of plate glass.

Heretofore it has been common practice to form plate glass by dumping molten glass upon a casting table, in front of a roll, and moving the glass pot along the roll while pouring. The sheet-forming roll is then moved over the mass of molten glass to spread the same upon the table, and thereby form a rough sheet or plate. However, difficulty has been experienced, in connection with the larger sheets, in effecting distribution of the molten glass upon the surface of the table. Sometimes the squeezing action of the sheet-forming roll is depended upon to spread the glass from the mid portion of the table to the edges thereof, and hooks are sometimes employed for dragging portions of the deposited mass of glass toward the edges of the table.

In leveling or spreading the mass of glass by the methods just described, it is customary to pour the glass against the face of the roll, thereby causing a chilled skin to form on a portion of the upper surface of the glass. This skin is rolled into the glass plate and forms a defect known in the art as ream and interferes with accurate visibility through the finished plate. In extreme cases actual lap seams and trapped bubbles in the sheet may be caused by older methods of spreading the glass in front of or against the roll.

One object of my invention is to provide a means and a method whereby glass may be dumped or poured out of a pot onto a table and quickly spread into a mass with little or no lateral movement of the pot along the roll, the glass assuming an elliptical contour without use of hooks, scoops or pot travel.

Another object of my invention is to provide means whereby the glass is so spread upon the casting table that the end portions of a plate formed therefrom are straighter than in the case of the older processes, and only a relatively small quantity of glass need be trimmed from the edges of the sheet in order to "square" the same.

One manner in which my invention may be practiced is disclosed in the accompanying drawing, wherein Fig. 1 is a diagrammatic plan view of a casting table and roller constructed in accordance with my invention and showing also a portion of a leer; Fig. 2 is a longitudinal sectional view of the apparatus of Fig. 1; Fig. 3 is a view taken on the line 3—3 of Fig. 1; Fig. 4 is a view taken on the line 4—4 of Fig. 1, and Fig. 5 is a view taken on the line 5—5 of Fig. 1.

Instead of providing a flat casting table as is common in the art, I employ a table 6 that may be of suitable dimensions but whose top surface has a laterally curved contour, as shown more clearly in Fig. 3, with its highest portion at the longitudinal center line of the table. A concave roller 7 is provided for rolling the glass upon the table 6, the concavity of the roller corresponding to the curvature of the glass-receiving surface of the table. Bars 8 are provided at the edges of the table, for determining the thickness of the glass in the usual manner.

When a mass of glass is deposited upon a flat table, without lateral pot travel, the tendency is for it to spread in circular form somewhat as indicated at 9. Movement of a cylindrical roller against the circular mass of glass causes it to gradually widen as indicated by the lines $9^a$. Since the larger portion of the glass is at the longitudinal center line of the table, the forward end of the sheet formed by passing the roller over the entire mass of glass has a curvature substantially as indicated at $9^b$. The large amount of spreading action required in order to effect movement of the glass to the edges of the table, as indicated by the lines $9^a$, is accompanied by massing and chilling at the mid portion of the roll (see contour $9^c$ Fig. 2), which in rolling out causes irregularities to appear in the finished sheet as laps, bubbles, ream, etc. Furthermore, a large amount of trimming and consequent waste is required, since the sheets are trimmed to rectangular form and a larger plate and a greater footage can be cut from a plate having contours $10^a$ to $10^b$ than from a sheet having contours $9^a$ and $9^b$.

Now if a mass of molten glass is deposited upon a table of convex form, it will assume an oval shape, as shown at 10, since the glass will tend to flow more toward the edges, which are at a lower lever than the mid portion of the table. Less spreading action is therefore required by the roller 7 and the molten glass will approach the edges of approximately the lines $10^a$, the angularity of the spread depending of course upon the fluidity of the glass and the curvature of the table, which will be so related as to secure the most effective spreading action.

During movement of the concave roller along the table, the glass will continue to flow toward the edges, independently of the squeezing action of the roller, so that instead of having a convex end to the sheet as indicated at 9$^b$, the end of the sheet will have approxmately the contour indicated at 10$^b$. That portion of the glass over which the roller has passed to flatten the same becomes thereby chilled to such extent that no appreciable flowing movement of the glass will take place at the rear of the roller, toward the edges of the table. The distance between the points of juncture of the lines 10$^a$ and 10$^b$ with the marginal edges of the table is much greater than the distance between the points of juncture of the lines 9$^a$ and 9$^b$ at such edges, thus securing the production of a relatively long rectangular sheet by the use of a convex table.

When the sheet has been formed and the roller removed, the glass is moved along an apron 11 and an annealing table 13, into a leer 12 where it is annealed in the usual manner. That end of the section 11 which lies next to the forward end of the table 6 has a curvature corresponding to the convexity of the table, but such curvature is gradually reduced and the forward end of the section 11 is preferably flat. The sheet as it leaves the table 6 is usually sufficiently plastic that it will settle upon the surface of the section 11 and therefore become flat as it advances to the table 13. If conditions were such that the sheet would not readily flatten of its own weight, a roller, not shown, could be mounted above the forward end of the section 11 so as to force the mid portion of the sheet into contact with the apron section 11.

While I have shown and described my invention as applied to the formation of glass sheets, it will be apparent that the method and apparatus may be employed in the formation of sheets or slabs of various kinds of plastic materials.

I claim as my invention:

1. The method of forming sheet glass, which comprises depositing a mass of molten glass upon a non-traveling table having a convex surface, and rolling said mass while on the table.

2. The method of forming sheet glass, which comprises depositing a mass of molten glass upon an elongated table having a convex surface, and passing a concave roller over the glass so deposited.

3. Apparatus for forming sheet glass, which comprises a glass-receiving table of elongated form whose longitudinal center line is elevated relative to its edges, and means for spreading glass longitudinally of the table.

4. Apparatus for forming sheet glass which comprises an elongated table for receiving a mass of molten glass, said table having its longitudinal center line elevated relative to its edges, and a concave roller for spreading the glass longitudinally of the table.

5. Apparatus for forming sheet glass comprising a table having a convex surface upon which a sheet of glass may be formed, and a flattening table at one end of the first-named table having a surface which tapers from a convexity corresponding to that of the first-named table to a plane.

6. The method of forming sheet glass, which comprises depositing a mass of molten glass upon a table, causing said glass to flow laterally so as to assume a contour whose longest axis extends transversely of the table, and then rolling the glass longitudinally of the same to form a sheet.

7. Apparatus for forming sheet glass, comprising a table having a convex glass receiving surface, a sheet-forming roll for spreading the glass on the table, a plane table for receiving a sheet of glass to be annealed, and an apron interposed between the annealing table and the sheet-forming table, the said table having that portion of its upper surface that is adjacent to the rolling table of concave form, and that portion of its surface adjacent to the annealing table lying in a plane.

Signed at city of Butler, Penna., this 8th day of February, 1926.

GEORGE E. HOWARD.